(12) United States Patent
Kapcoe et al.

(10) Patent No.: US 6,523,561 B2
(45) Date of Patent: Feb. 25, 2003

(54) SNAP-TOGETHER FILTER SYSTEM FOR TRANSMISSION OIL PAN AND METHOD OF MANUFACTURE

(75) Inventors: John C. Kapcoe, Southgate, MI (US); Robert M. Waters, Canton, MI (US); Todd M. Willis, Walled Lake, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 179 days.

(21) Appl. No.: 09/769,114

(22) Filed: Jan. 24, 2001

(65) Prior Publication Data

US 2002/0096221 A1 Jul. 25, 2002

(51) Int. Cl.[7] .................................................. F01M 1/10
(52) U.S. Cl. .................... 137/15.01; 137/590; 184/6.24; 210/168
(58) Field of Search .............................. 137/590, 15.01; 184/6.24; 210/168

(56) References Cited

U.S. PATENT DOCUMENTS

| | | |
|---|---|---|
| 1,587,800 A | 6/1926 | Saives |
| 1,868,055 A | 7/1932 | Edwards |
| 2,010,430 A | 8/1935 | Howard et al. |
| 2,306,823 A | 12/1942 | Meldrum |
| 2,437,008 A | 3/1948 | Doehren |
| 2,441,681 A | 5/1948 | Werder |
| 3,211,256 A | 10/1965 | Teutsch |
| 3,211,291 A | 10/1965 | Teutsch |
| 3,707,202 A | 12/1972 | Dixon |
| 4,264,443 A | 4/1981 | Anderson et al. |
| 4,930,469 A | 6/1990 | Kamprath et al. |
| 5,099,954 A | 3/1992 | Kikuchi et al. |
| 5,130,014 A | 7/1992 | Volz |

*Primary Examiner*—Gerald A. Michalsky
(74) *Attorney, Agent, or Firm*—Reising, Ethington, Barnes, Kisselle, Learman & McCulloch, P.C.

(57) ABSTRACT

An oil reservoir for a vehicle transmission includes a separately formed oil pan and suction tube each formed of plastics material. A filter cartridge is disposed about a lower end portion of the suction tube to filter oil entering an oil inlet of the suction tube at the lower end. The suction tube and floor of the oil pan have snap-together connecting structure. To assemble the suction tube with the floor of the oil pan, the tube is simply pressed toward the pan causing the connecting structure to engage with a snap-fit connection.

21 Claims, 3 Drawing Sheets

SNAP-TOGETHER FILTER SYSTEM FOR TRANSMISSION OIL PAN AND METHOD OF MANUFACTURE

BACKGROUND OF THE INVENTION

1. Technical Field

This invention relates generally to oil reservoirs for vehicle transmissions, and more particularly to those having an in-pan filter.

2. Related Art

Vehicular transmissions are typically equipped with an oil pan mounted at the bottom of the transmission to serve as a reservoir for lubricating oil. It is common to incorporate a filter within the interior of the oil pan for cleaning the oil in the reservoir before being drawn back into the transmission. In some applications, the filter is provided as a separate, self-contained module having a filter medium encased by a filter housing which is supported off the floor of the pan. Other known constructions use the floor of the pan as a lower half of the filter housing and fix a cover permanently to the wall of the pan, with the filter medium being trapped between the cover and floor. In some cases, the pan and cover are made of plastics. The construction and assembly can be somewhat involved and require specialized equipment, fasteners, etc. to assemble the filter/cover structure to the pan.

It is an object of the present invention to simplify the construction and assembly of such oil reservoir systems.

SUMMARY OF THE INVENTION AND ADVANTAGES

An oil reservoir for a vehicle transmission constructed according to the invention includes an oil pan, a suction tube, and a filter cartridge. The oil pan has a floor. The suction tube has a lower end portion adjacent the floor that is formed with a fluid inlet to admit oil from the pan into the tube, and an upper end portion connectable to an oil pump for drawing the oil through the tube. The filter cartridge is disposed about the lower end portion of the suction tube in position to filter oil entering the inlet of the tube. The floor and suction tube include matable snap-together connecting structure securing the suction tube to the floor and capturing the filter cartridge on the suction tube.

According to a further aspect of the invention, a method is provided for making an oil reservoir for a vehicle comprising forming an oil pan having a floor with connecting structure, forming a suction tube having an oil inlet at the lower end portion thereof and with connecting structure engageable in snap-lock relation with the connecting structure of the pan in response to pressing the connecting structures together. The method further includes disposing a filter cartridge about the lower end portion of the suction tube in position to filter oil entering the oil inlet. The lower end portion of the suction tube is pressed toward the floor of the pan with sufficient force to engage the connecting structure of the pan and tube with a snap-lock connection to secure the suction tube to the floor and to secure the filter cartridge on the suction tube.

The invention has an advantage of providing a simply constructed, easy to assemble and install oil reservoir for vehicles. The snap-together connecting structure provided on the floor of the pan and on the suction tube enable the suction tube and filter element to be assembled and then secured to the pan by simply pressing the tube into place with sufficient force to cause the connecting structure to snap together. No special tools are required and the assembly can be accomplished by hand or machine in a automated process.

THE DRAWINGS

These and other features and advantages of the present invention will become more readily appreciated when considered in connection with the following detailed description and appended drawings, wherein.

DETAILED DESCRIPTION

Figure 1:
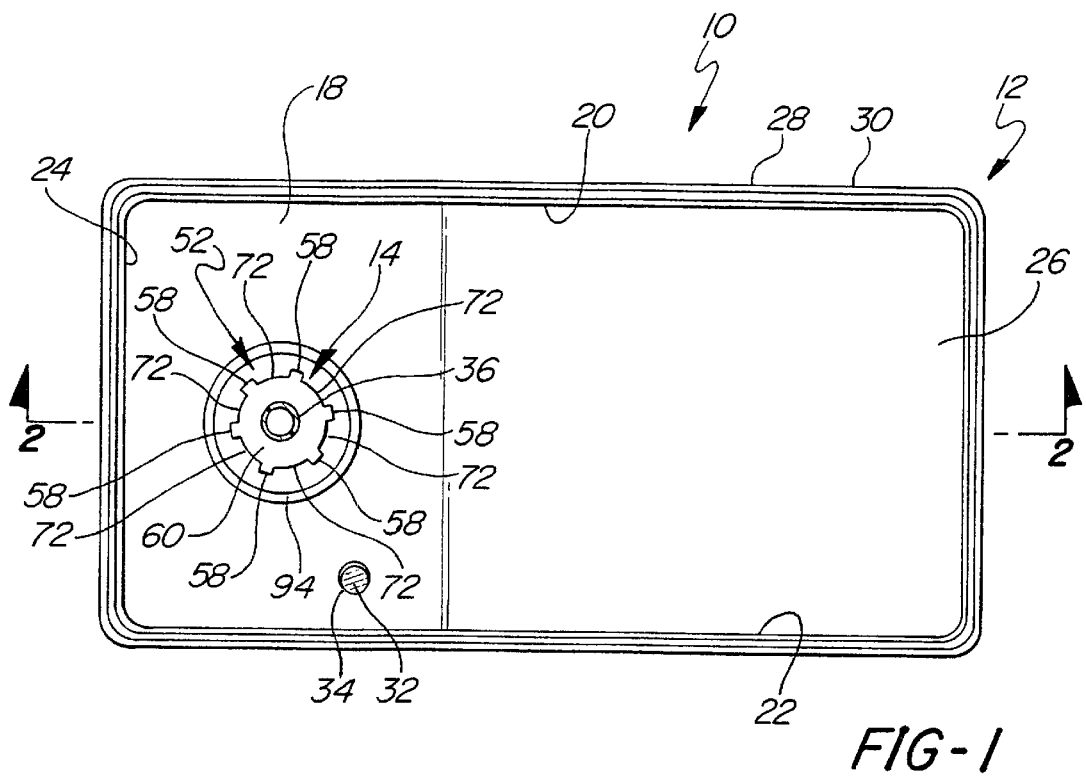
FIG. 1 is a plan view of an oil reservoir constructed according to a presently preferred embodiment of the invention.
Figure 2:
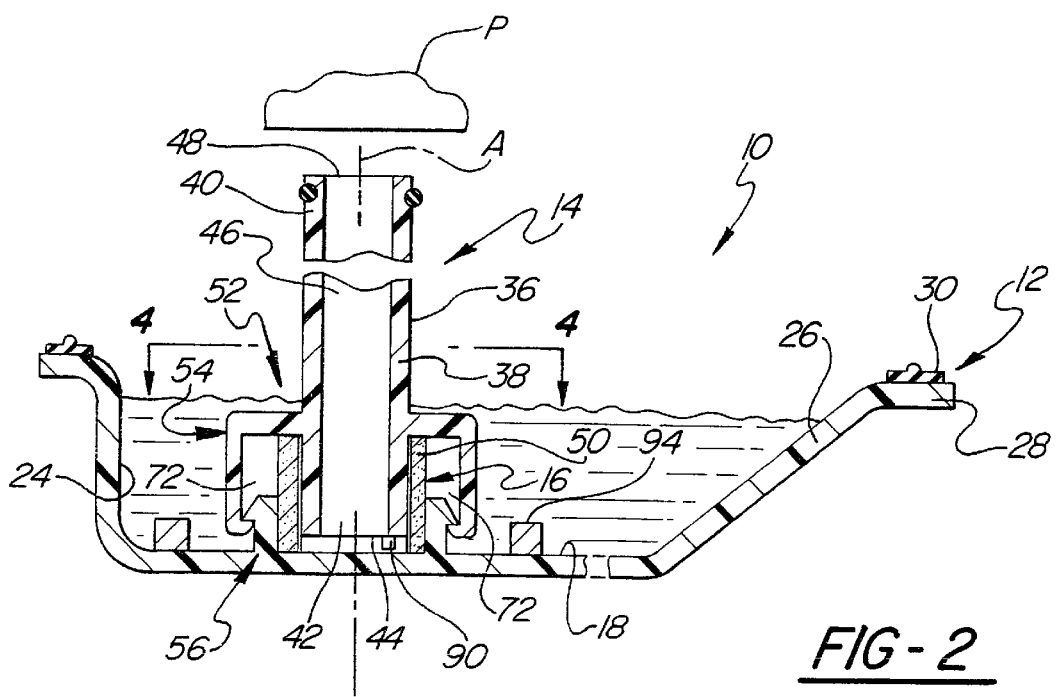
FIG. 2 is a cross-sectional view taken along lines 2—2 of FIG. 1.

An oil reservoir for a vehicle which is particularly well suited for a vehicle transmission is indicated generally at 10 in FIGS. 1 and 2 and comprises an oil pan 12, a pick-up or suction tube 14, and a filter cartridge 16.

The oil pan 12 has a floor 18 which extends laterally between spaced side walls 20,22. The walls 20,22 project upwardly from the floor 18 in laterally spaced relation to one another. The pan 12 further includes an end wall 24 projecting up from the floor 18 at one end and extending between the side walls 20,22, and an opposite end wall 26 which extends upwardly from the floor 18 and adjoins the side walls 20,22. The end walls 24,26 are spaced from one another in the longitudinal direction of the pan 12. The end wall 26 may be sloped as best shown in FIG. 2. The floor 18 and upwardly projecting walls 20, 22, 24, and 26 define a recess or well for containing a supply of lubricating oil L for use in lubricating a transmission (not shown) of a vehicle (not shown) in known manner. The walls 20, 22, 24 and 26 of the pan 12 terminate at their upper end in a mounting flange 28 which may be fitted with a suitable seal or gasket 30 for mounting the oil pan 12 in fluid-tight relation to a vehicle transmission (not shown) or other device for which the pan 12 serves as a reservoir for oil. A drain plug 32 is removably installed in a threaded drain hole 34 formed in the floor 18 of the pan 12 to enable the oil to be selectively drained from the pan 12 when needed. The pan 12 is preferably molded as one piece from a rigid structural plastics material, such as nylon which may be glass filled. The drain plug 32 may be made of metal or plastics.

The suction tube 14 has a tubular body section 36 which is preferably substantially cylindrical in shape. The body section 36 has a lower end portion 38 and an upper end portion 40. The lower end portion 38 has at least one oil inlet 42 at or adjacent a lower end 44 of the tube 14 for admitting oil from the pan 12 into an interior passage 46 of the tube 14. The upper end portion 40 of the tube 14 is suitably configured for attachment to an oil pump P of a transmission, or the like, which is operative to draw oil from the inlet 42 through the suction tube 14 and out through an open upper end 48 of the tube 14 for use in lubricating the working components of the transmission (not shown). The tube 14 is preferably linear and extends along a longitudinal axis A between the lower 38 and upper 40 end portions.

According to the invention, the suction tube 14 is mounted within the oil pan 12 with the lower end portion 38 adjacent the floor 18 of the pan 12, so that the oil inlet 42 is immersed in the oil L within the pan 12.

The filter cartridge 16 is disposed about the lower end portion 38 of the suction tube 14 in position to filter oil entering the inlet 42 of the tube 14. The filter cartridge 16 preferably encircles the lower end portion 38 of the suction tube 14 and has an inner surface shape which corresponds closely to that of the outer surface shape of the section tube 14. Preferably, the lower end portion 38 has a cylindrical outer surface configuration and the inner surface of the filter cartridge 16 is preferably cylindrical. The filter cartridge 16 is preferable circumferentially continuous. The filter cartridge includes fluid-permeable filter medium 50 which may be constructed of materials typically employed as filter medium materials in oil reservoir applications of the type to which the invention is directed. For example, the filter medium 50 may comprise a woven or fibrous mat of synthetic fibers, an open cell synthetic sponge or the like having small openings which permit the passage of oil therethrough while preventing and filtering out dirt and other debris from entering the suction tube 14 and thus the pump P.

The inner diameter of the filter cartridge 16 is preferably sized in relation to the outer diameter of the lower end portion 38 such that the filter cartridge 16 fits snugly on the lower end portion 38. When installing the filter cartridge 16, the lower end 44 of the suction tube 14 is extended into one end of the filter cartridge 16, and the filter cartridge 16 slid onto the suction tube 14 into position as shown in FIG. 2. The snug fit of the filter cartridge 16 introduces frictional interference between the filter cartridge 16 and suction tube 14 which is preferably sufficient to support the filter cartridge 16 from slipping off the lower end 44 of the suction tube 14 when the tube 14 is positioned with the lower end 44 pointed downwardly. In this manner, the filter cartridge 16 is self-supporting on the suction tube 14 through a frictional fit. Of course, other means of retaining the filter cartridge 16 about the suction tube 14 are contemplated, such as adhesives, projecting barbs engaging the filter cartridge, and other mechanical retention structure acting on the filter cartridge 16 to support it on the suction tube 14.

The filter medium 50 is preferably elastically expandable in the circumferential direction to aid installation of the filter cartridge 16 about the tube 14. The filter medium 50 may be initially slightly undersized in relation to the suction tube 14 such that it is caused to expand slightly when disposed about the suction tube 14 as in FIG. 2. The elastic return forces impart a constricting force on the suction tube 14 to help support the filter cartridge 16 in position on the tube 14 once installed.

According to a further aspect of the invention, a snap-together connecting system 52 is provided for connecting the suction tube 14 to the floor 18 of the oil pan 12 by simply pressing them together with a predetermined assembly force along the longitudinal axis A. One half of the connecting structure 54 is provided on the suction tube 14. The other half of the connecting structure 56 is provided on the floor 18. The connecting structures 54,56 are preferably formed as a unitary portion with their respective suction tube 14 and oil pan 12 structures. As such, the connecting structure 54 is preferably molded as one piece with the structure of the suction tube 14 out of structural plastics material, such as nylon, glass-filled nylon or the like, and the connecting structure 56 associated with the floor 18 is preferably molded as one piece with the structure of the oil pan 12 out of the same plastics material. Alternatively, one or both connecting structures 54,56 may be separately made and then joined to the suction tube 14 and oil pan 12 either following the formation of the suction tube 14 and oil pan 12, or integrated therewith during manufacture (e.g., molded-in-place).

The connecting structure 54 of the suction tube 14 includes at least one and preferably a plurality of latch arms 58. The latch arms 58 preferably extend from a base 60 provided on the lower end portion 38 of the suction tube 14 in longitudinally spaced relation to the lower end 44. The base 60 is preferably circumferentially continuous in the form of an annular flange which extends continuously about the outer surface of the suction tube 14 and projects radially outwardly therefrom beyond the outer surface of the filter cartridge 16. The base 60 presents an inner abutment shoulder 62 spaced from and facing axially toward the lower end 44 of the suction tube 14. The inner abutment shoulder 62 confronts the upper end of the filter cartridge 16 and serves to limit how far the filter cartridge 16 can be slid onto the suction tube 14, so as to fix the location of the upper and lower ends 64,66 of the filter cartridge 16 relative to the suction tube 14. The base 60 covers the upper end 64 of the filter cartridge 16, such that any oil in the pan 12 approaching the filter cartridge 16 from above is deflected by the base 60 radially outwardly for interaction with the outer diameter surface 68 of the filter cartridge 16.

Figure 3:
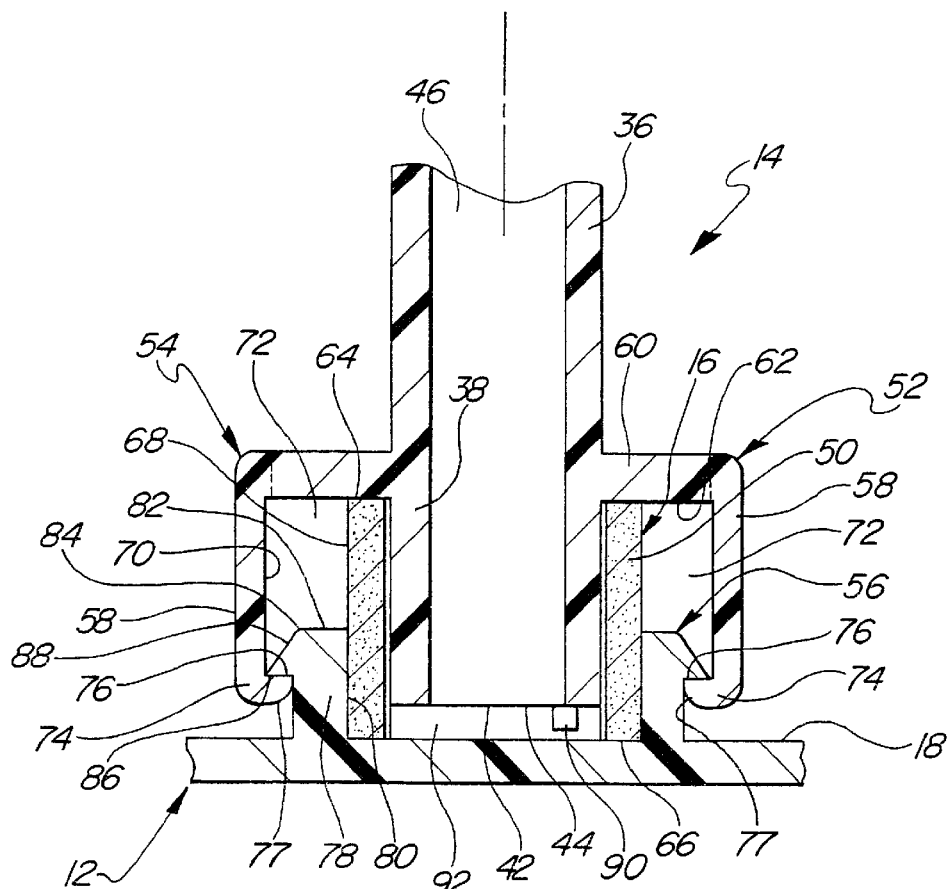
FIG. 3 is an enlarged fragmentary cross-sectional view of a portion of the reservoir.

The latch arms 58 preferably commence at the base 60 and are formed as one piece therewith and extend axially downwardly therefrom in generally parallel relationship to the longitudinal axis A of the suction tube 14. The latch arms 58 have a radially inner surface 70 which is preferably spaced from the outer diameter surface 68 of the filter cartridge 16. The latch arms 58 are preferably spaced circumferentially from one another, as best shown in FIG. 3, to present openings or windows 72 through which the oil in the pan 12 may flow for interaction with the filter cartridge 16 upon entry into the oil inlet 42 of the tube 14. The latch arms 58 have lock heads 74 adjacent their lower free ends. The lock heads 74 each include a lock shoulder 76 projecting from the inner surface 70 of the latch arms 58 radially inwardly toward the outer surface of the suction tube 14. The latch arms 58 are elastically deformable or flexible radially of the axis A of the suction tube 14, such that the lock heads 74 are able to deflect under force radially outwardly from the suction tube 14 and return to their original condition upon removal of the force. The lock heads 74 of the latch arms 58 are formed with a camming surface 78 for imparting such force to the latch arms 58 as will be explained below when interacting with the connecting structure 56 of the floor 18.

The connecting structure 56 of the floor 18 preferably includes a collar 78 projecting upwardly from the floor 18. The collar 78 is preferably formed as one piece with the floor 18 of the same material. The collar 78 has an inner diameter surface 80. The inner diameter surface 80 is equal to or slightly larger than the outer diameter surface 68 of the filter cartridge 16, such that the filter cartridge 16 is received within the collar 78, as is the lower end 44 of the suction tube 14. The collar 78 thus locates and supports the suction tube 14 and filter cartridge 16 within the pan 12 against lateral movement transverse to the axis A of the tube 14. The collar 78 has an upper end 82 spaced from the inner abutment shoulder 62 of the latch arm base 60. The collar 78 comprises a cylindrical wall which is preferably circumferentially continuous such that oil entering the oil inlet 42 must pass over the collar 78.

The collar 78 has a lock head 84 adjacent the upper end 82 of the collar 78. The lock head 84 is configured to cooperate with the lock heads 74 of the latch arms 58 so as to lock the suction tube 14 to the floor 18 in response to forcing the lock heads 82,84 into snap-together engagement in the axial direction A of the suction tube 14. The lock head 84 of the collar 78 preferably extends continuously about the collar 78 such that the lock heads 74 of the latch arms 58 are engageable with the lock head 84 of the collar 78 irrespective of the circumferential orientation of the suction tube 14 relative to the collar 78. The lock head 84 presents an annular lock shoulder 86 projecting radially outwardly from an outer wall of the collar 78 and facing downwardly toward the floor 18. The shoulder 86 engages the shoulder 76 of the latch arms 58 when the suction tube 14 is coupled to the collar 78 in locked condition. The lock head 84 further includes a camming surface 88 projecting from the outer surface of the collar outwardly and downwardly toward the shoulder 86. The camming surface 88 is sized and positioned so as to confront the camming surfaces 77 of the latch arm lock heads 74 during installation of the suction tube 14 in the pan 12 as will now be described.

To manufacture and assemble the oil reservoir 10 according to the invention, the oil pan 12 and suction tube 14 are separately manufactured and each provided with their respective connecting structure 54,56. The filter cartridge 16 is separately manufactured from the pan 12 and suction tube 14 and installed on the suction tube 14 over the lower free end 44 and is self-supported through frictional contact between the filter cartridge 16 and suction tube 14.

The suction tube 14 and filter cartridge 16 are assembled as a unit with the oil pan 12 by guiding the lower end portion 38 and lower end of the filter cartridge 16 into the collar 78 to properly locate the suction tube 14 within the oil pan 12. The suction tube 14 and filter cartridge 16 are secured by forcing the lock heads 74 of the latch arms 58 into engagement with the lock head 84 of the collar 78. As the suction tube 14 is forced axially downwardly toward the floor 18 of the pan 12, in the longitudinal direction A, the camming surfaces 77 of the latch arm lock heads 74 engage the camming surface 88 of the collar 78. As the lock heads 74 of the latch arms 58 advance downwardly, the interaction of the camming surfaces 77,88 flex the latch arms 58 radially outwardly, allowing the lock heads 74,84 to pass by one another, at which point the latch arms 58 spring back to their original condition bringing the locking shoulders 76 of the latch arms 58 into confronting engagement with the lock shoulder 86 of the collar 78. In this way, the snap-together connecting structure 54,56 secures the suction tube 14 and filter cartridge 16 against removal from the floor 18 of the oil pan 12 in the axial direction A of the tube 14.

It will be appreciated that the snap-together connection of the suction tube 14 with the floor 18 of the oil pan 12 can be achieved in a simple pressing operation and can either be performed by hand or by machine in an automated process.

As illustrated in FIG. 2, it is preferred that the filter cartridge 16 be compressed between the abutment shoulder 62 of the connecting structure 54 and the floor 18 of the oil pan 12. Such axial compression of the filter cartridge 16 seals the axial ends of the filter medium 50 such that oil must pass through the filter and is sealed against flowing around the filter at its ends. In this embodiment, the filter cartridge 16 further supports the lower end 44 of the suction tube 14 off the floor 18 of the oil pan 12 so that oil can flow through the filter and beneath the suction tube 14 to gain access to the inlet 42 at the open lower end 44 of the suction tube 14. However, as is also shown in FIG. 2, the lower free end 44 of the suction tube 14 may be formed with one or more spacers 90 projecting downwardly from the lower end 44 toward the floor 18 and may either engage the floor 18 with the compression of the filter cartridge 16 or be spaced therefrom to make certain that a space 92 is maintained between the lower end 44 of the suction tube 14 and the floor 18 of the oil pan 12 once assembled.

A magnet 94 is mounted on the floor 18 of the oil pan 12. The magnet 94 is preferably annular and surrounds the collar in radially spaced relation thereto. The magnet 94 serves to remove magnetic metal particles contained in the oil as it flows over the magnet 94 from any direction toward the filter cartridge 16. The magnet 94 is preferably molded in place with the formation of the oil pan 12, but may be secured by other means such as adhesives or the like.

Figure 4:
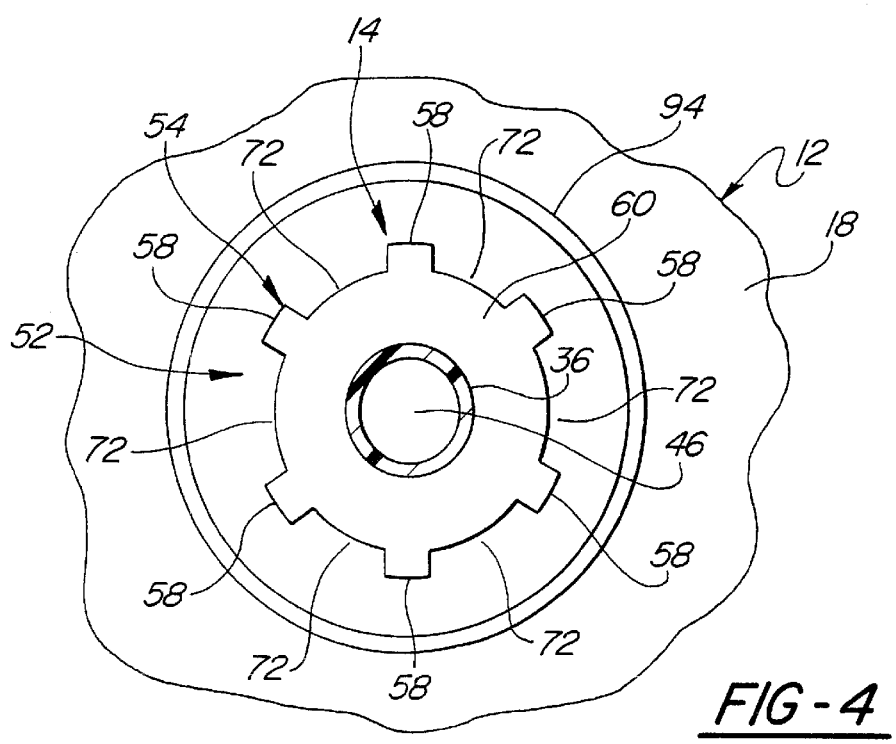
FIG. 4 is an enlarged fragmentary plan view taken along lines 4—4 of FIG. 2.
Figure 5:
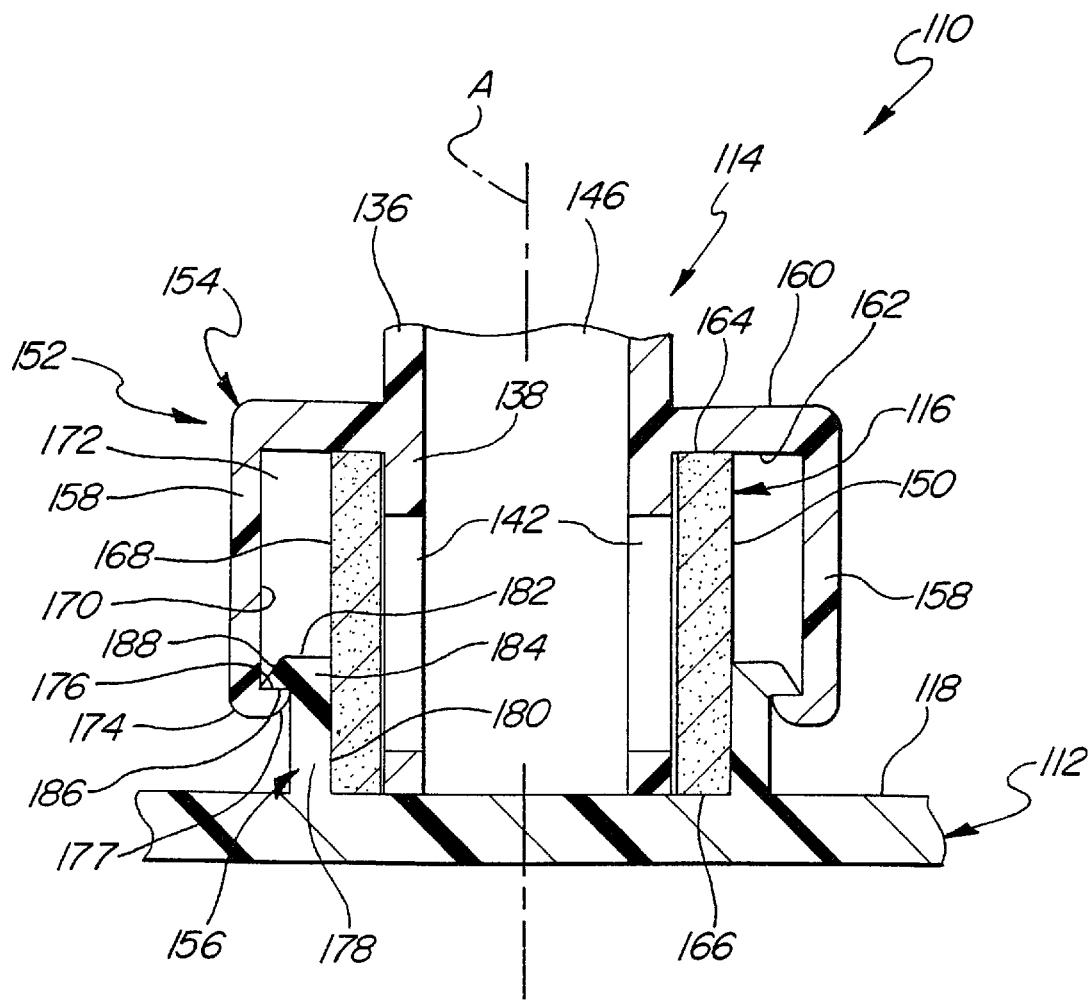
FIG. 5 is an enlarged fragmentary partially sectioned view of a lower end portion of an alternative suction tube construction of the invention.

FIG. 4 shows an alternative embodiment 110 of the invention, and particularly the lower end portion 138 of the suction tube 114. The same reference numerals are use to represent like features as described in the first embodiment, but are offset by 100. The pan 112 and filter cartridge 116 are identical as described for the first embodiment above. The connecting structure 154,156 are likewise identical. The principal difference with the second embodiment 110 is that the oil inlet 142 is defined by a plurality of elongate slots formed in the lower end portion 138 and surrounded by the filter cartridge 16. The lower end 144 of the suction tube 114 confronts the floor 118, limiting the compression of the filter cartridge 116.

Obviously, many modifications and variation of the present invention are possible in light of the above teachings. It is, therefore, to be understood that within the scope of the appended claims, the invention may be practiced otherwise than as specifically described. The invention is defined by the claims.

What is claimed is:

1. An oil reservoir for a vehicle transmission comprising:
   an oil pan having a floor for housing lubricating oil;
   a suction tube having a lower end portion adjacent said floor and formed with a fluid inlet to admit the oil from said pan into said tube, and an upper end portion connectable to an oil pump for drawing the oil through said tube;
   a filter cartridge disposed about said lower end portion of said suction tube in position to filter oil entering said inlet of said tube; and
   said floor and said suction tube including matable snap-together connecting structure securing said suction tube to said floor and capturing said filter cartridge on said suction tube.

2. The reservoir of claim 1 wherein said connecting structure includes a lock collar formed on said floor of said pan.

3. The reservoir of claim 2 wherein said connecting structure includes at least one latch arm formed on said suction tube.

4. The reservoir of claim 3 wherein said latch arm includes a lock head.

5. The reservoir of claim 4 wherein said lock collar includes a lock head.

6. The reservoir of claim 5 wherein said lock head of said latch arm has a camming surface and said lock head of said collar has a camming surface engagable with said camming surface of said latch arm.

7. The reservoir of claim 3 wherein said connecting structure includes a plurality of said latch arms extending from said suction tube.

8. The reservoir of claim 7 wherein said plurality of said latch arms extend about said filter cartridge.

9. The reservoir of claim 8 wherein said latch arms include a base presenting an inner abutment shoulder confronting said filter cartridge and limiting longitudinal movement thereof along said tube in a direction away from said floor.

10. The reservoir of claim 9 wherein said filter cartridge is dimensioned for a snug fit about said tube so as to be self-supporting thereon through frictional engagement with said tube.

11. The reservoir of claim 9 wherein said abutment shoulder is spaced a predetermined distance from said floor when said latch arms engage said collar.

12. The reservoir of claim 11 wherein said filter cartridge confronts both said abutment shoulder and said floor.

13. The reservoir of claim 12 wherein said filter cartridge is axially compressed between said abutment shoulder and said floor.

14. The reservoir of claim 8 wherein said latch arms are disposed radially outwardly of said collar.

15. The reservoir of claim 8 wherein said latch arms are spaced circumferentially from one another.

16. The reservoir of claim 1 including a magnet disposed on said floor and encircling said tube.

17. The reservoir of claim 1 wherein said pan includes walls extending upwardly from said floor, said suction tube and said connecting structure being spaced from said walls.

18. The reservoir of claim 1 wherein said oil pan is fabricated of plastics material.

19. The reservoir of claim 18 wherein said suction tube is fabricated of plastics material.

20. A method of making an oil reservoir for a vehicle, comprising:

forming an oil pan having a floor with connecting structure;

forming a suction tube having a lower end portion with an oil inlet and connecting structure engagable in snap-lock relation with the connecting structure of the pan in response to pressing the connecting structures together;

disposing a filter cartridge about the lower end portion of the suction tube in position to filter oil entering the oil inlet; and pressing the lower end portion of the suction tube toward the floor of the pan with sufficient force to engage the connecting structure of the pan and tube with said snap-lock connection to secure the suction tube to the floor and to secure the filter cartridge on the suction tube.

21. The method of claim 20 including forming the pan, suction tube and connecting structure of plastics material.

* * * * *